(12) United States Patent
Posa

(10) Patent No.: US 11,909,896 B2
(45) Date of Patent: Feb. 20, 2024

(54) SMARTPHONE BINOCULARS

(71) Applicant: John G. Posa, Ann Arbor, MI (US)

(72) Inventor: John G. Posa, Ann Arbor, MI (US)

( * ) Notice: Subject to any disclaimer, the term of this patent is extended or adjusted under 35 U.S.C. 154(b) by 0 days.

(21) Appl. No.: 17/383,156

(22) Filed: Jul. 22, 2021

(65) Prior Publication Data
US 2022/0191311 A1    Jun. 16, 2022

Related U.S. Application Data

(63) Continuation of application No. 17/120,141, filed on Dec. 12, 2020, now Pat. No. 11,115,512.

(51) Int. Cl.
| | |
|---|---|
| *H04M 1/02* | (2006.01) |
| *H04N 13/239* | (2018.01) |
| *H04N 23/57* | (2023.01) |
| *H04N 23/63* | (2023.01) |
| *H04N 23/67* | (2023.01) |
| *H04N 13/296* | (2018.01) |
| *H04N 23/45* | (2023.01) |

(52) U.S. Cl.
CPC ......... *H04M 1/0266* (2013.01); *H04M 1/027* (2013.01); *H04M 1/0254* (2013.01); *H04M 1/0256* (2013.01); *H04M 1/0264* (2013.01); *H04M 1/0268* (2013.01); *H04N 13/239* (2018.05); *H04N 23/57* (2023.01); *H04N 23/632* (2023.01); *H04N 23/671* (2023.01); *H04M 2250/52* (2013.01); *H04N 13/296* (2018.05); *H04N 23/45* (2023.01)

(58) Field of Classification Search
None
See application file for complete search history.

(56) References Cited

U.S. PATENT DOCUMENTS

| | | | |
|---|---|---|---|
| 11,115,512 B1 * | 9/2021 | Posa | H04M 1/0264 |
| 2005/0062870 A1 * | 3/2005 | Sato | H04N 5/2251 |
| | | | 348/335 |
| 2017/0299842 A1 * | 10/2017 | Posa | G02B 7/06 |

(Continued)

OTHER PUBLICATIONS

B&H, "Sony DEV-3 Digital Recording Binoculars" (Archived version as of Aug. 10, 2016, https://web.archive.org/web/20160810043115/https://www.bhphotovideo.com/c/product/818031-REG/Sony_DEV_3_DEV_3_Digital_Recording_Binoculars.html/) (Year: 2016).*

*Primary Examiner* — David N Werner
(74) *Attorney, Agent, or Firm* — Law offices of John G. Posa

(57) ABSTRACT

Hand-held devices combine smartphones and electronic binoculars. In "in-phone" embodiments, binocular functionality is integrated directly into the housing or body of a smartphone modified in accordance with the invention, whereas, in "in-case" embodiments, the binoculars are integrated into a case to receive a smartphone which may be of conventional design. In either case, components within the phone may be used for image manipulation, image storage, and/or sending and receiving/streaming stereoscopic/3D motion imagery. The objective lenses for the binoculars are preferably supported on or in one of the longer side edges of the phone or case, whereas the display magnifying eyepieces are preferably associated with the opposing longer side edge of the phone or case. As such, in use, a user holds the phone or case in a generally horizontal plane during use as binoculars.

18 Claims, 8 Drawing Sheets

(56) References Cited

U.S. PATENT DOCUMENTS

2020/0393910 A1* 12/2020 Gribetz .................. G06F 3/013
2021/0099557 A1*  4/2021 Cha ..................... H04M 1/0237
2021/0124389 A1*  4/2021 NakaMats ............. G06F 1/1647

* cited by examiner

SMARTPHONE BINOCULARS

REFERENCE OF RELATED APPLICATIONS

This application is a continuation of U.S. patent application Ser. No. 17/120,141, filed Dec. 12, 2020, the entire content of which is incorporated herein by reference.

FIELD OF THE INVENTION

This invention relates generally to digital and electronic binoculars and, in particular, to compact digital and electronic binoculars combined with smartphones.

BACKGROUND OF THE INVENTION

Cellular phones with integrated functionality—i.e., smartphones—have become the standard platform for a wide variety of hardware and software features, including cameras, GPS, flashlights, calculators, as well as application software or 'apps' for email, maps, games, social media and numerous other capabilities.

There have been attempts to convert smartphones into binoculars. However, existing approaches seek to attach optical devices to the body of the phone, resulting in an non-optimal solution. There remains an outstanding desire for additional smartphone-related enhancements, including more elegant, capable and easy-to-use smartphone-binocular integrations.

SUMMARY OF THE INVENTION

In broad and general terms, this invention combines smartphones with binoculars, enabling the user to conveniently carry and use binocular functionality by simply reaching for their phone. In some embodiments (the "in-phone" embodiments), the binoculars are integrated directly into a smartphone. In alternative embodiments (the "in-case" embodiments), the binoculars are integrated into a case to receive an existing smartphone.

In the in-phone embodiments, the binoculars gain functionality from processing, memory and/or communications components within the phone for image manipulation, image storage, and/or sending and receiving stereoscopic/3D imagery. In the in-case embodiments, the binoculars may function entirely independently of the smartphone. However, more preferably, a wired or wireless connection is made between the in-case binoculars and the smartphone, thereby enabling the binoculars to take advantage of smartphone features and functions as well.

In all embodiments, the binoculars are electronic binoculars in the sense that although some optical components are used, the binoculars take advantage of electronic image sensors and displays. The objective lenses for the binoculars are preferably supported on or in one of the longer side edges of the phone or case, whereas the display magnifying eyepieces are preferably associated with the opposing longer side edge of the phone or case. As such, in use, a user holds the phone or case in a generally horizontal plane, preferably with the front, touch-screen display surface of the phone facing upwardly. In preferred embodiments this enables the user to use the touch screen of the phone for binocular-related controls such as focusing, zoom, image capture, and so forth.

Smartphone binoculars according to the invention comprise a housing defining front and back surfaces, opposing top and bottom edge surfaces, and opposing first and second side edge surfaces. The opposing first and second side edge surfaces may either comprise the surfaces of a smartphone including the inventive capabilities described herein, or the opposing first and second side edge surfaces may form at least a portion of a case adapted to receive a smartphone, including a smartphone of conventional design from any current or future manufacturer.

A pair of spaced-apart, right and left imagery-gathering devices are disposed on a first side edge surface of the housing, and a pair of spaced-apart right and left image-displaying devices are disposed on an opposing second side edge of the housing. Right and left image sensors convert the imagery gathered by the right and left image-gathering devices into electrical signals representative of the right and left imagery, respectively. Electronic circuitry on or in the housing receives the electrical signals from the right and left image sensors and simultaneously displays the imagery on the right and left image-displaying devices, thus providing electronic binocular functionality.

While the invention may be used to gather, store, send and receive still imagery, in the preferred embodiments, the imagery gathered and displayed is real-time motion imagery. Whether the housing forms part of the body of a smartphone or a case therefor, a touch-screen display defines the front surface of the housing, and in some embodiments, touch-activated controls are provided on the touch-screen display enabling a user to manually adjust focus, zoom, image capture, and so forth. In preferred embodiments, the electronic circuitry may be further operative to perform an auto focusing of the imagery.

The right and left image-gathering devices may include objective optics, and the objective optics may project the imagery directly onto right and left image sensors immediately adjacent the objective optics. Alternatively, the right and left image sensors may be spaced apart from the right and left image-gathering devices to increase focal length, and/or one or more optical components may be disposed between the right and left objective optics and the right and left image sensors to perform optical focusing or optical zoom functions.

In embodiments wherein the housing forms at least a portion of a case for an existing smartphone, an interface may be provided enabling the electronic circuitry of the case to communicate with the smartphone and utilize the processor, memory or wireless communications capabilities of the smartphone to manipulate, store or transmit the imagery, or receive imagery from an external source for display on the viewfinders.

Preferred embodiments of the invention may further include apparatus for adjusting interpupillary distance; apparatus for determining when the binoculars are oriented to provide an instant-on function; apparatus for stabilizing the imagery; apparatus for interpolating the imagery; apparatus for zooming the imagery in and out under user control; and/or LIDAR operative to assist with focusing the imagery. In some embodiments the image sensors may operate in the infrared (IR) portion of the electromagnetic spectrum enabling the binoculars to perform a night vision function.

The housing may comprise a rectangular housing, wherein the distance between the upper and lower edge surfaces is greater than the opposing side edge surfaces, which is greater than the spacing between the front and back surfaces. The housing may further including manually deployable light shields proximate to the right and left image-displaying devices to act as blinders to block stray light during use.

While larger and smaller diagonal sizes may be used, the right and left image-displaying devices are preferably microdisplays with diagonal measurements of 0.5 inches or less, with one or more optical components being used to magnify the microdisplays. The right and left image sensors may be separate solid-state devices, or the right and left image sensors use different regions of the same solid-state device.

DETAILED DESCRIPTION OF THE PREFERRED EMBODIMENTS

Figure 1:
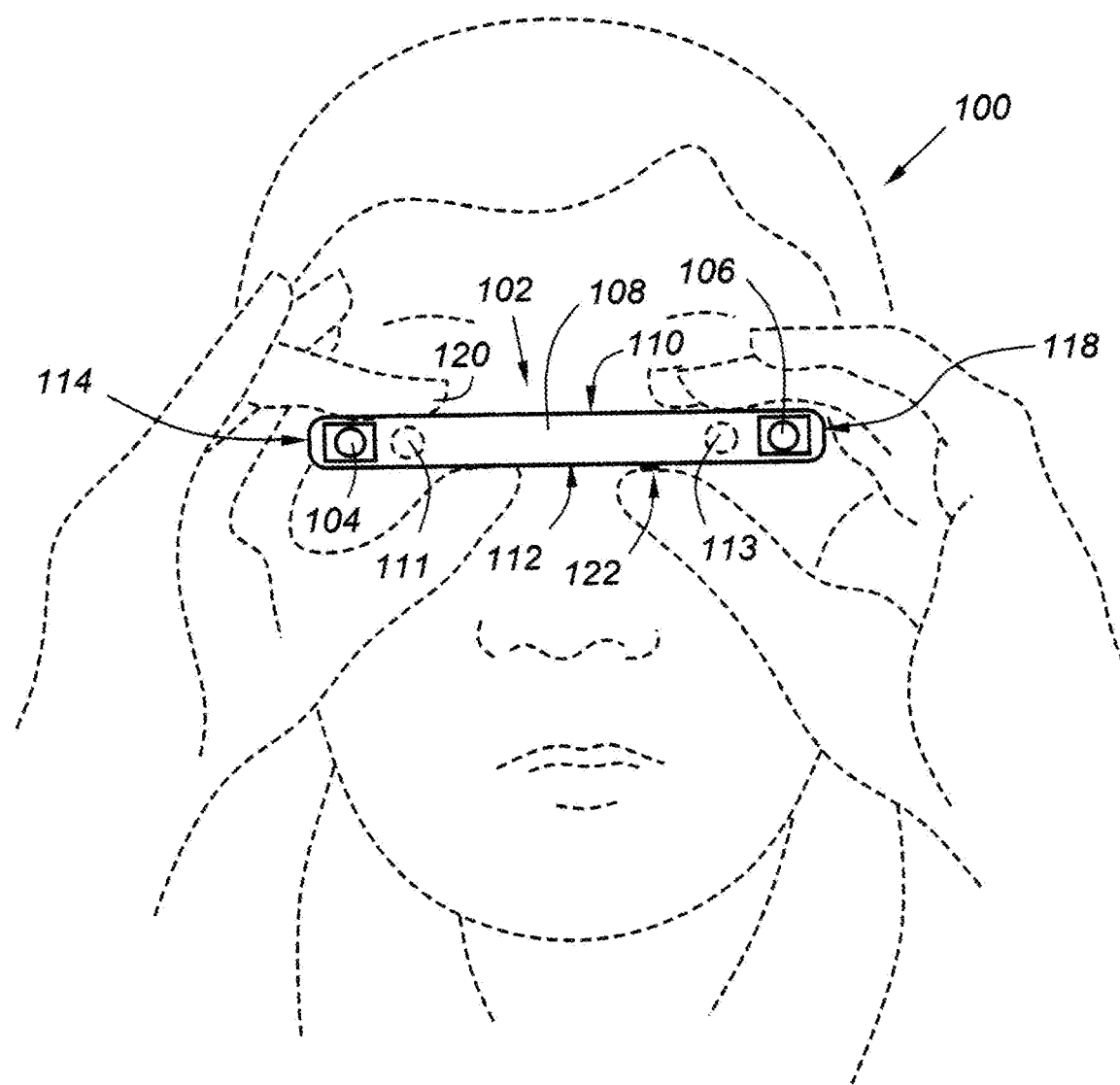
FIG. 1 is a simplified, introductory drawing that illustrates the way in which the invention may be used.

FIG. 1 is a simplified, introductory drawing that illustrates the way in which the invention is typically used. In this drawing, device 102 may represent either an "in-phone" embodiment of the invention, wherein binoculars are integrated directly into the body of a smartphone, or an "in-case" embodiment of the invention, wherein binoculars are integrated into a case for a smartphone. Thus, as used herein, "housing" may be taken to include the outer shell of a smartphone with integrated binoculars or a case adapted to receive a smartphone. Further, "smartphone" should be taken to include any hand-held portable communications device from any manufacturer, including cellphones, that include additional capabilities that may or may not be related to telecommunications.

Returning to FIG. 1, a user 100 typically holds the in-phone or in-case device 102 in a horizontal plane, with a first edge surface 108 facing outwardly. Edge surface 108 contains two light-gathering objectives 104, 106. Note that as used herein, "objective" should be broadly interpreted to mean two areas or regions associated with gathering right and left images of a remote scene or subject matter. Thus, depending upon the implemented embodiment, objectives 104, 106 may be lenses or other optical components such as mirrors, or even apertures or ports in optical communication with lenses or other optical components. An opposing side edge surface 109, not visible in this view, faces the user. This edge surface includes two corresponding oculars or eyepieces 111, 113 which user 100 views. Optics in the oculars or eyepieces perform display magnification. In all embodiments, electronic or mechanical devices may be provided for diopter adjustment to match prescription eyewear, and to accommodate interpupillary adjustment as described with reference to FIG. 4.

Additionally, "lens" or "optics" should be taken to include one or more optical elements capable of providing required or desired image-forming or transmission functions. Those of skill in optics will appreciate that multiple lenses or groups may be used to enhance image quality, and that the total number of lenses may be reduced through the use of aspherical surfaces. The lenses may be plastic or glass, and anti-reflection coated surfaces are preferably used. The invention is not limited in terms of the optical design, and any possible zoom range may be implemented.

Touch-screen surface 110 of the smartphone typically faces upwardly during use to better enable a user to control operation, including binocular functioning. For example, the user may slide a fingertip 120 on the touchscreen surface to control focus, zoom and/or other functions during binocular use. Physical and other touch controls may also be provided on other surfaces of the device. For example, a physical button may be provided to record an image, and/or touch controls may be provided on the bottom surface 112, in which case a user's thumb(s) may be used. References 114, 118 represent the top and bottom edge surfaces of the device which, again, may or may not include binocular-related controls.

Figure 2A:
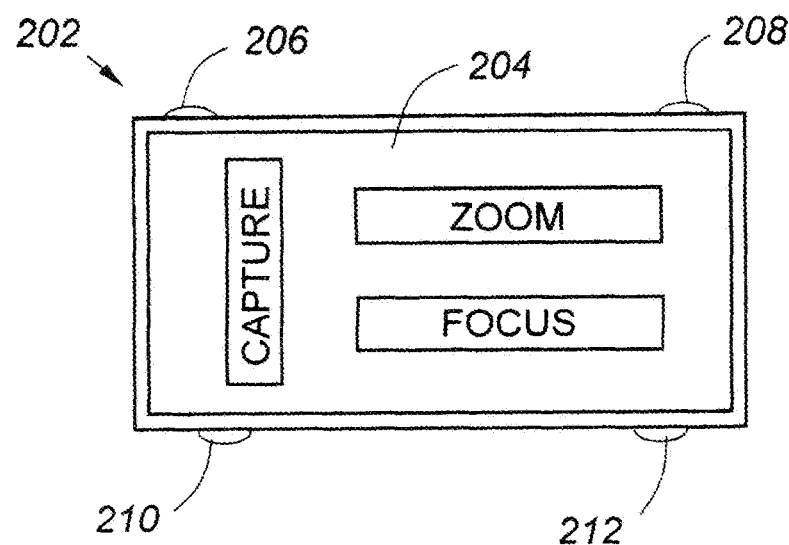
FIG. 2A is a top-down view of an in-phone embodiment of the invention, showing how the touch-screen of the phone may provide binocular-related user controls.

FIG. 2A is a top-down view of an in-phone embodiment of the invention, assuming a user is holding the device in accordance with the orientation depicted in FIG. 1. In this version of the invention, the objective lenses 206, 208 and oculars 210, 212 are integrated into the body of the phone 202. Image processing and other functions also use devices internal to the phone, which may include the phone's primary central processing unit (CPU), electronic components dedicated to operation of the binoculars and battery power. During use of the smartphone as binoculars, touch-screen display 204 may provide binocular controls for focus, zoom, image capture/recall or other functions. Such display regions may be implemented as slider bars or touch areas.

Figure 2B:
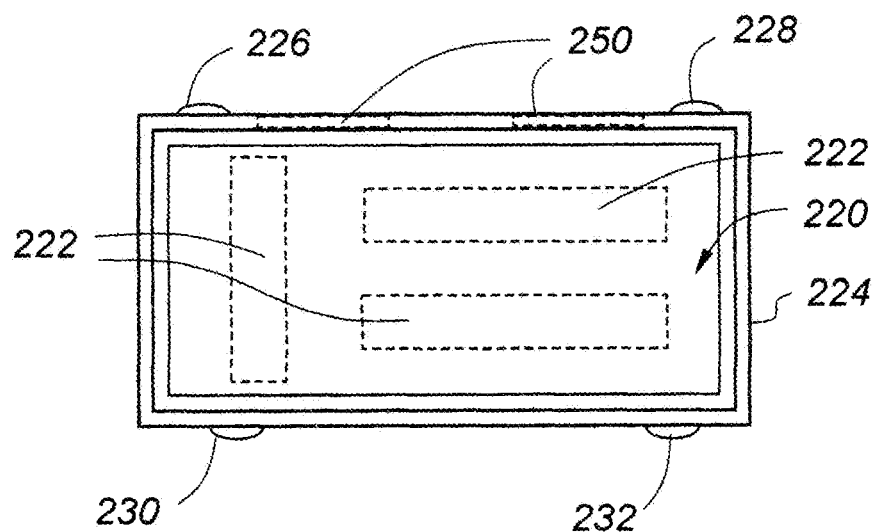
FIG. 2B is a top-down view of an in-case embodiment of the invention, showing how binocular-related user controls may be provided on/in the case and/or the touch-screen of the phone.

FIG. 2B is a top-down view of an in-case embodiment of the invention, also assuming a user is holding the device in accordance with the orientation depicted in FIG. 1. In this embodiment the case 224 includes a cavity configured to receive a phone 220, which may be of conventional design regardless of manufacturer. The appearance and use of the device is very similar to the in-phone embodiment of FIG.

2A, except that objectives 226, 228 and eyepieces 230, 232 are disposed on/in case 224. The display of the phone forms one of the surfaces of the overall housing of the device surrounded by the outer edge surfaces.

In the in-case embodiments of the invention, the binoculars may function entirely independently of phone 220, including necessary electronics and battery being disposed within the case as well. Preferably, however, the in-case binoculars communicate with phone 220 through a physical and/or wireless connection, thereby enabling a user to make use of processor(s) or memory in the phone for added functionality, including the provision of on-screen controls 240 for focus, zoom, image capture or other binocular-related functions as with the in-phone embodiments. If the in-case embodiment is not in communication with the phone, binocular-related controls 250 for functions such as focusing, zoom and image capture/recall would be provided on the case.

As a further alternative, voice commands may be used in either embodiment, such as ZOOM IN, ZOOM OUT, STOP and CAPTURE. Since the phone may already knows that it is in "binocular mode," there should be no need to preface the voice commands with an introductory utterance. For the sake of convenience, in either or both embodiments, the device may sense when a user places the edge with the eyepieces proximate to a user's face, in which case the device may automatically enter into the binocular mode. This would save time when a user wants to view fleeting subject matter. Such sensing may be thermal, as with an IR sensor between the eyepieces, or optically, with the eyepieces themselves sensing the eyes of a user. For reasons of privacy, automatic entry into binocular mode may be carried out independently of phone-related functions, which may require further authentication.

FIGS. 3A-3D depict different possible optical path layouts applicable to both the in-phone and in-case embodiments, except that processor 300 would be in the phone or in the case respectively. In the preferred embodiment of FIG. 3A, objectives 302 form images onto respective image sensors 304 which deliver electrical signals to processor 300 along lines 305. User controls are depicted schematically at 318. "Objectives" should be taken to include any optical components such as lenses, including compound, aspheric, etc. used to image formation. Image sensors are preferably state-of-the-art solid-state CCD or, more preferably CMOS devices. The invention is not limited in terms of image sensor technology.

Figure 3A:
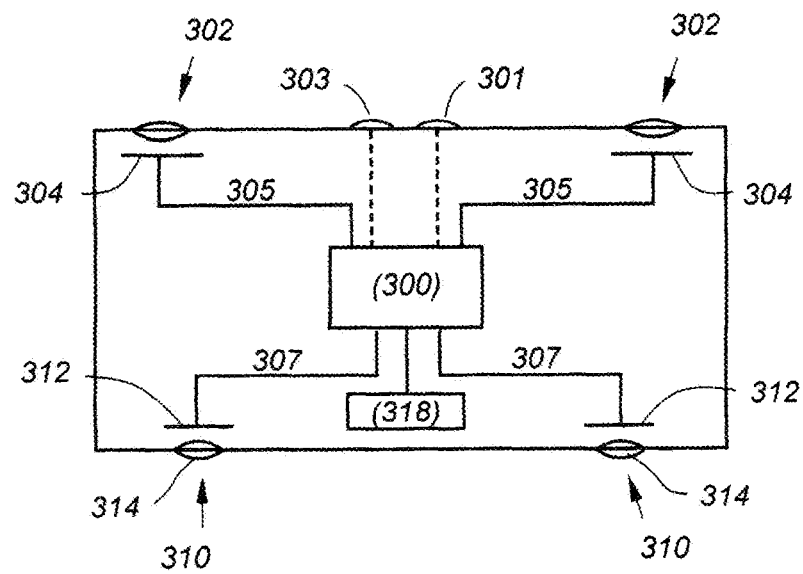
FIG. 3A is a simplified block diagram illustrating one possible optical path layout applicable to both in-phone and in-case embodiments, wherein right and left image sensors deliver electrical signals to a processor, and wherein the processor delivers corresponding signals to right and left viewfinder displays.

In FIG. 3A, it is assumed that zoom is digital in the sense that there are no moving parts. In this case, a portion of the image on sensors 304, are electronically expanded prior to presentation to the user, resulting in magnified images. Interpolation or other enhancement techniques known in the art may be used to improve image quality. Note also that image sensors 304 may operate beyond the visible region of the spectrum, into the infrared, for example, such that the device may be used for binocular night vision. The user may enter into a night vision mode in which case sensor sensitivity and/or image processing may be optimized for low-light conditions, and an optional infrared illuminator 301 may be used to illuminate a scene outside of the visible range.

All embodiments may further include the use of a LIDAR (light detection and ranging) sensor(s) (i.e., 303) for improved focusing, 3D visualization or other advantages. Scanning or array-type LIDAR technologies may be used; for example, the latter may be implemented with an array of vertical cavity surface-emitting lasers (VCSELs), with the return flash(es) being detected by an array of single-photon avalanche diodes (SPADs) or other devices.

Continuing the reference to FIG. 3A, electrical signals representative of the stereoscopic images captures by the objectives 302, 304 are delivered along paths 307 to eyepieces 310. Eyepieces 310 include left and right microdisplays 312 and any appropriate magnification components such as lenses 314. As with the objectives, lenses 314 should be taken to include compound, aspheric, Fresnel variations.

Fortunately, microdisplay technology is advancing to the point where small near-to-eye (NED) devices are useful to the invention. Microdisplays can be made from a range of display technologies, including liquid-crystal (LCD), LCD on silicon (LCoS) and others. In the preferred embodiments, MicroLED (light emitting diode) or, more preferably, organic LED (OLED) microdisplays would be used. In time, holographic microdisplays may also be implemented.

Figure 3B:
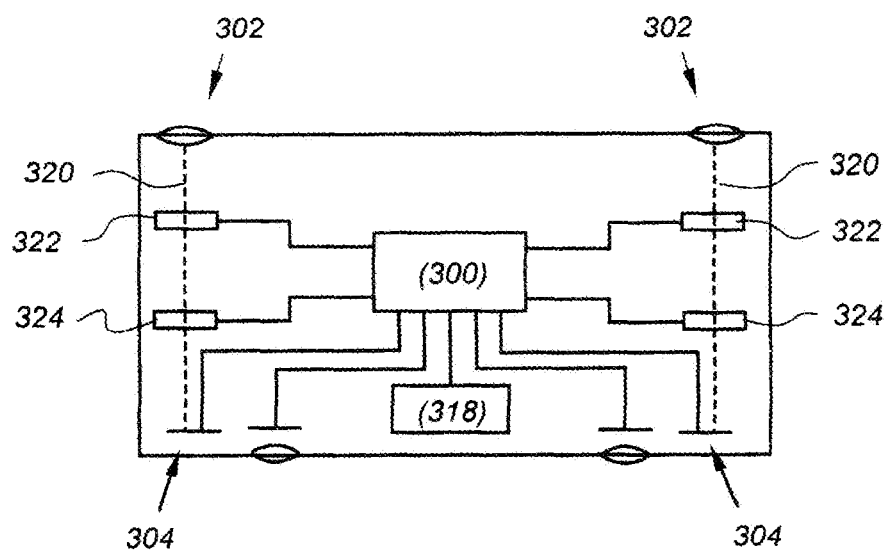
FIG. 3B is a simplified block diagram showing an alternative optical paths wherein, to improve telephoto operation, image sensors may be arranged at a distance from objectives.

In all embodiments autofocus, manual focus, or a combination of auto and manual may be used. Any known autofocus technologies may be implemented, including contrast-based, phase-based, dual-pixel or time-of-flight/laser-based (i.e., with a LIDAR sensor). To improve telephoto operation, image sensors 304 may be arranged at a distance from objectives 302 along optical paths 320, as shown in FIG. 3B. This not only facilitates inherently longer focal lengths, it allows for optical zoom, or a combination of optical and digital zoom, as well as additional focusing techniques. In FIG. 3B, optical zoom components and focusing components are illustrated at 322 and 324, respectively, under control of processor 300 and/or settings of user control(s) 318. Each optic 322, 324 may incorporate a plurality of lenses, including at least one focusing lens and at least one zoom lens having a variable focal length.

Figure 3C:
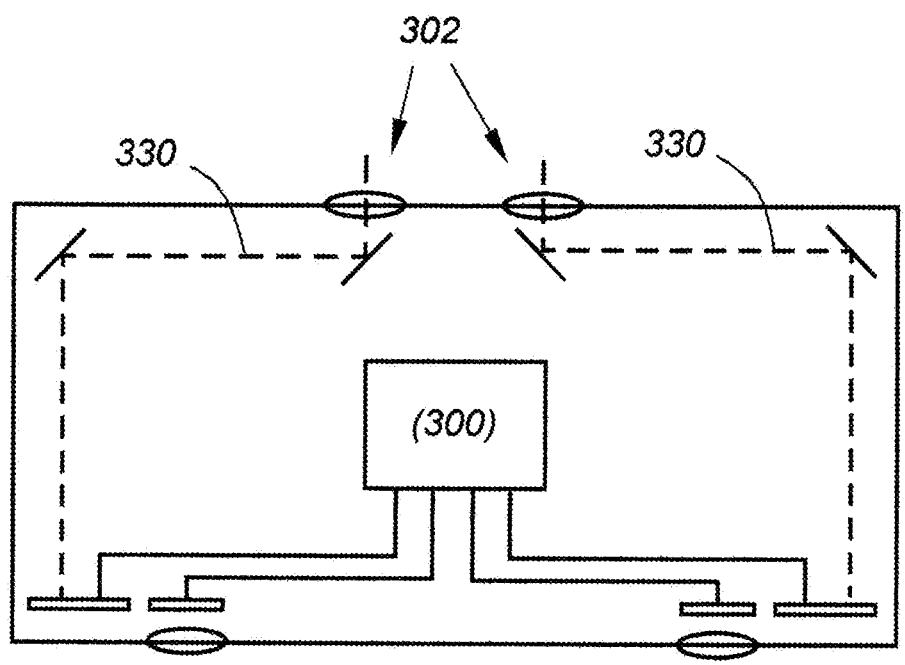
FIG. 3C is a simplified block diagram showing how mirrors or other beam-redirecting optical devices such as prisms may be used to further increase optical focal length.
Figure 3D:
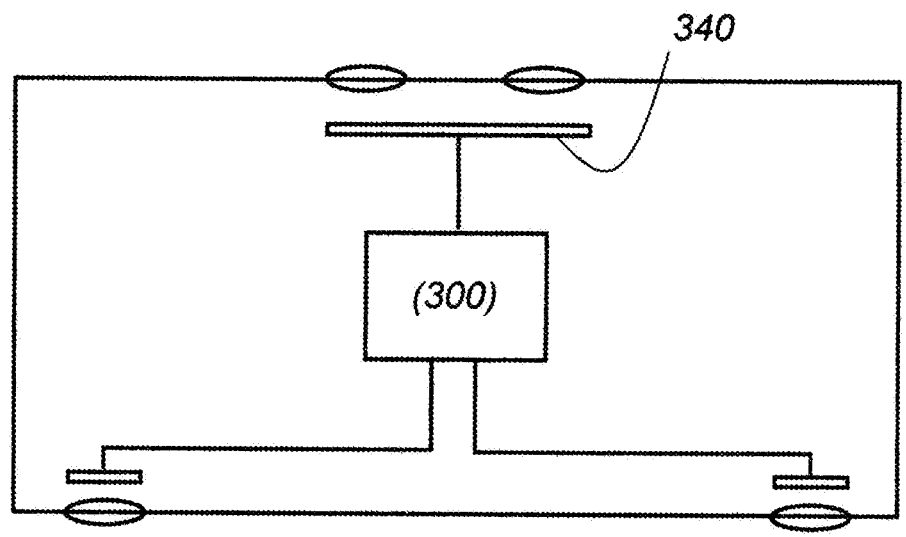
FIG. 3D illustrates the way in which a single image sensor may be shared; that is, with one portion of the sensor being used for the right image and another portion of the sensor being used for the left.

To even further expand optical focal length, mirrors or other beam-redirecting optical devices such as prisms may be used. As one example, FIG. 3C shows the use of mirrors and objectives that are closer together. Optical components for zoom, focus, and so forth may also be supported in paths 330. As shown in FIG. 3D, particularly if objectives are placed closer together, a single image sensor 340 may be shared; that is, with one portion of the sensor being used for the right image and another portion of the sensor being used for the left.

Figure 4A:
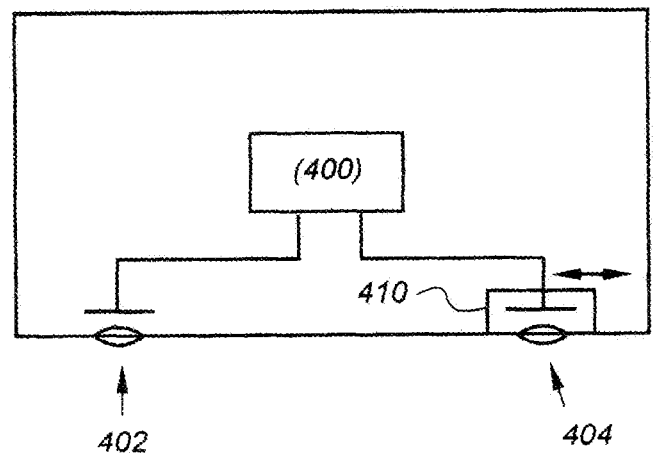
FIG. 4A illustrates a manual interpupillary adjustment technique wherein at least one of the eyepieces is fixed, and at least the other eyepiece slides laterally.

As mentioned, the invention anticipates the need for interpupillary adjustment. This may be accomplished manually or electronically with no moving parts. FIG. 4A illustrates a manual technique wherein at least one of the eyepieces 402 is fixed, whereas at least the other eyepiece 404 slides from right to left. Thus, the ocular and microdisplay for one eye would be contained in a translatable compartment 410, enabling the distance between the eyepieces or viewfinders to be adjusted from 55 to 65 mm, more or less.

Figure 4B:
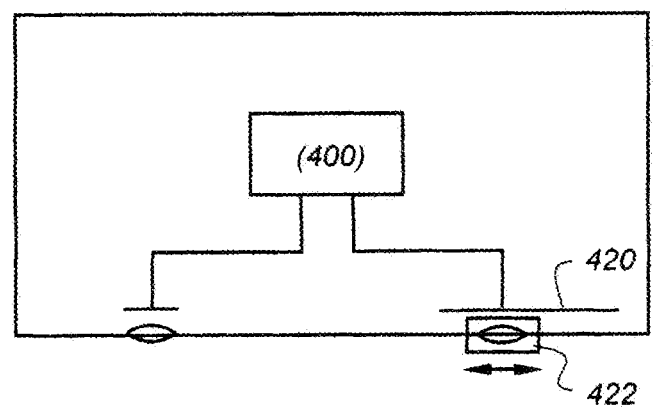
FIG. 4B illustrates an alternative, semi-manual arrangement interpupillary adjustment technique wherein an elongated microdisplay is used in conjunction with a moveable lens.

FIG. 4B illustrates a semi-manual arrangement wherein an elongated microdisplay 420 is used in conjunction with a moveable lens 422. In this implementation, the side-to-side movement of lens (or lens assembly) would be sensed, causing a corresponding shifting of the image on the display 420 to coincide with position of the lens.

Figure 4C:
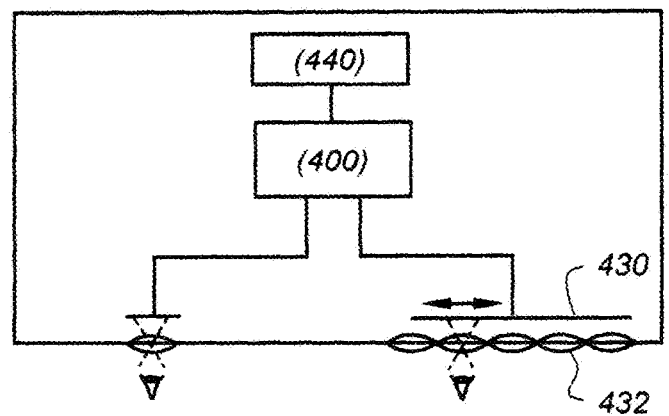
FIG. 4C shows an interpupillary distance adjustment technique that requires no moving parts, wherein an elongated microdisplay is used in conjunction with an elongated array of lens elements.

FIG. 4C shows an interpupillary distance adjustment technique that requires no moving parts. In this case, an elongated microdisplay 430 is used in conjunction with an elongated array of lens elements 432. To adjust interpupillary distance, a user control 440 interfaced to processor 400 is used to shift the position of the image on the display from left to right until it corresponds to the lens in array 432 determined to be most comfortable to the user.

Figure 5:
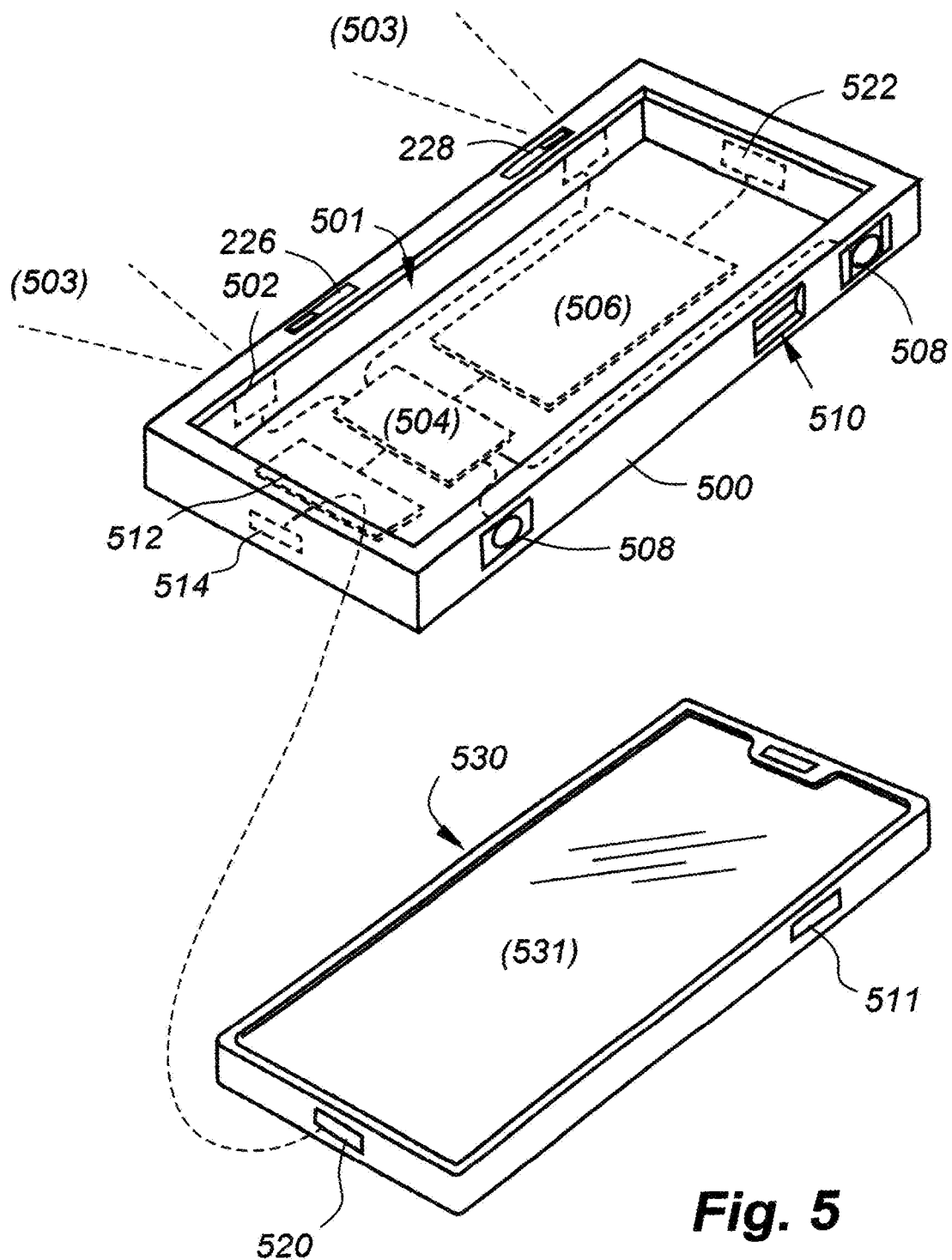
FIG. 5 is a perspective view of an in-case embodiment of the invention including a block diagram showing important electronic components.

FIG. 5 is a perspective view of an in-case embodiment of the invention and a smartphone configured for coupling to the case. The case, 500, includes a structure adapted to receive a smartphone in housing 530. In one preferred embodiment, the structure includes a cavity 501 physically dimensioned to receive a smartphone of conventional design, such that when received, the touch-screen display 531 of the phone forms the upper surface of a generally rectangular hand-held device.

The various features that comprise the binoculars are preferably molded into the case material, which also acts to cushion the phone. The image sensors/objectives, shown at 502, having fields of view 503, and eyepieces/oculars 508, make respective interconnections to an electronic processing module 504, which may be integrated into the bottom or back surface of the case, along with rechargeable battery 506. One or both of the eyepieces/oculars 508 may include any of the interpupillary adjustment capabilities disclosed herein. The case 500 may include one or more cut-outs or moveable panels 510 enabling a user to manipulate controls such as on the phone when received by the case. It is anticipated that different in-case versions of the invention may be designed to accommodate phones from different manufacturers.

Electronics module 504 may perform basic image processing functions such as brightness, focus, zoom, and so forth, with no complex image manipulation, storage or communications. However, more sophisticated stand-alone in-case embodiments may include optical zoom, LIDAR and/or night vision, as well as graphics processing for image interpolation or stabilization, a memory for image storage and recall, and independent wired or wireless communications capabilities for image sharing and downloading for stereoscopic viewing. Stand-alone in-case embodiments would also provide binocular-related controls 226, 228 on the case 500, which may be touch controls, mechanical sliders, dials, buttons, etc., making respective connections to the processor 504 through the broken lines indicated.

While stand-alone, in-case embodiments of the invention need not communicate with the phone, one or more communications interface(s) are preferably provided to facilitate communication with the smartphone to take advantage of the components and functionality provided by the smartphone. A connector 514 may be provided on an inner surface of the case to receive a corresponding connector 520 of the phone when received by case 500. As is common, phone connector 520 may also be used to recharge the phone's battery. Connector 514 may also be used for recharging in-case battery 506, thereby obviating the need for connector 522.

As opposed to a hardwired connection making a direct, physical connection to the phone, the interface between the case and the phone may be wireless, using wireless communication circuitry in module 512, which may be integrated into or separate from processor module 504. Any suitable wireless interface may be used, including Bluetooth, WiFi, or any known or yet-to-be developed communications protocol.

Whether physical, wired, optical or wireless, the advantages of providing an interface to the smartphone are many, including the use of the phone's processor for advanced image processing functions, including image stabilization, interpolation, etc.; use of the phone memory for image storage and recall; and use of the phone's cellular and/or WiFi interfaces for image sharing, posting on Internet web sites, live streaming of stereoscopic/3D images, and so forth. Further, and importantly, the case-to-phone interface facilitates the use of the phone's touch screen for binocular control functions, as shown in FIG. 2B.

In both in-case and in-phone embodiments, particularly if image storage/recall and/or higher-speed communications interfaces are provided, the viewfinders may alternatively be used to watch stereoscopic imagery derived from other internal or external sources such as 3D movies, virtual reality (VR) animation, augmented reality (AR), and so forth, from memory or streaming sources.

Figure 6:
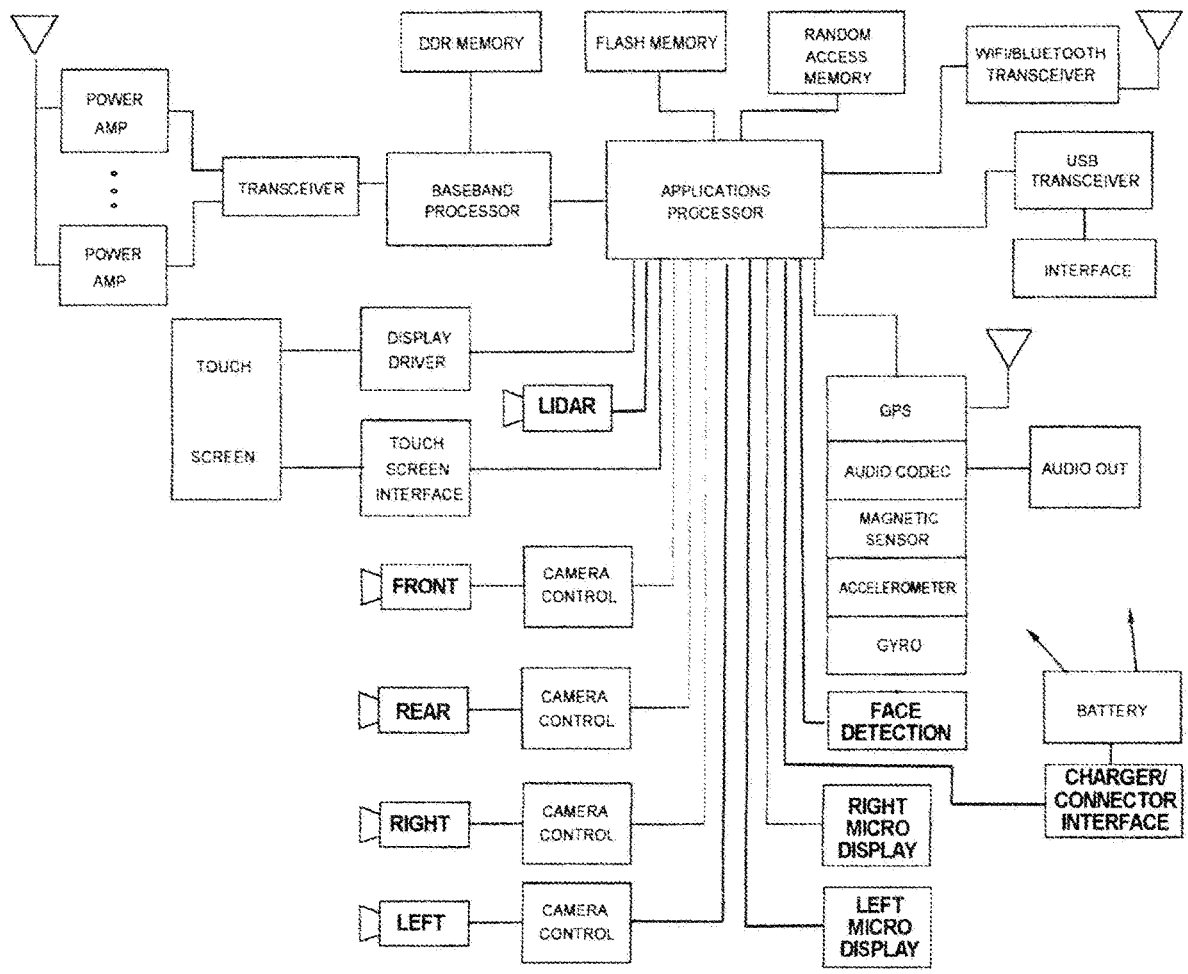
FIG. 6 is a block diagram of an in-phone embodiment of the invention.

FIG. 6 is a block diagram of an in-phone embodiment of the invention. The front and rear cameras and controls each represent the usual one or more still/video cameras now present on the front and back surfaces of smartphones. The right and left cameras and controls, however, as well as the right and left microdisplays represent the image-gathering and image-displaying apparatus that would be added to a conventional smartphone on the opposing side edge surfaces of the device. The face detection block may optionally be added to either embodiment disclosed herein to effectuate an 'instant-on' functionality as described above.

Figure 7:
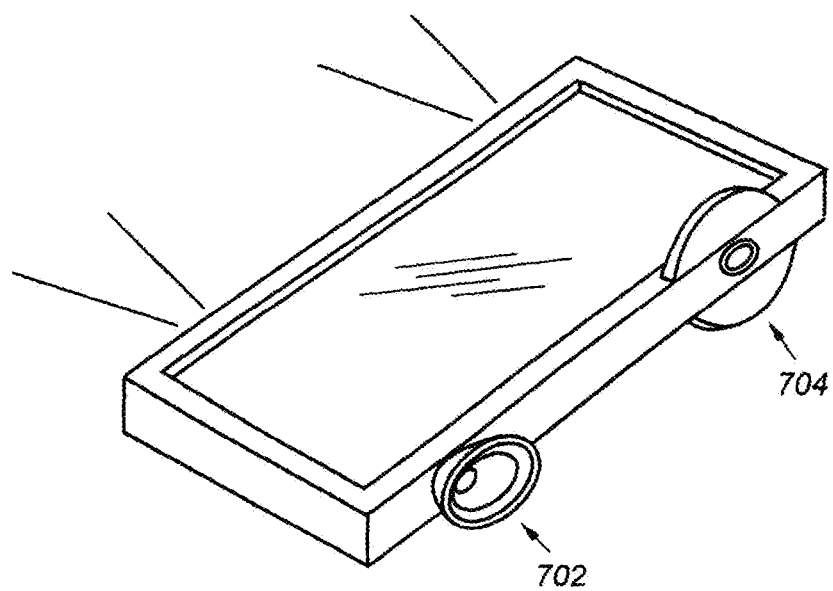
FIG. 7 is a drawing that shows light shields or deployable blinders used to block stray light.

Operations associated with binocular imagery display, manipulation, storage and send/receive would be carried out by the block labeled applications processor, through additional processors may be added for more advance functions. While not evident in FIG. 6, any of the optical path arrangements of FIGS. 3, 4 are applicable to the in-phone embodiments of the invention provided suitable accommodations are made in the body of the smartphone device. In all embodiments monaural or stereo sound may be gathered and or recorded along with the stereoscopic imagery, which would be useful when using the binoculars for bird watching, opera glasses, and other applications. FIG. 7 is a drawing that shows how built-in (702) or manually deployable (704) blinders may be incorporated into the either embodiment of the invention to block stray light.

In all embodiments of the invention, hardware and/or software may be used to ensure that binocular functions are immediately available despite battery usage and privacy issues. For example, one or more sensors may be provided to assume that the device is oriented for binocular use, whereby the right/left image sensors and associated viewfinder displays would be powered up and ready for use. Sensing might include, for example, detection that the device is oriented in a generally horizontal plane with at least one finger touching a binocular-related control or the phone's touch-screen display. Alternatively, an infrared (IR) or other type of proximity sensor may be disposed on the side edge of the housing containing the viewfinders, which would indicate that the device has been positioned adjacent the face of a user.

In terms of privacy, particularly with in-phone embodiments, provision may be made so that others may use the device as binoculars without having access to more personal, phone related functions. For example, an application program or "app" may be provided on the phone to enable use of the device as binoculars—including 'instant-on' capabilities of the type described above—while restricting other uses of the phone, including cellular access, on a selective basis through menus in the app.

In all embodiments, optical, digital or hybrid image stabilization may be used. The differences in the techniques are known to those of skill in the art, and the technologies are evolving rapidly. In the preferred embodiments of this invention, real-time digital or electronic (EIS) image stabilization is used, as EIS is most preferred for motion imagery, and the algorithms are improving dramatically. Optical and digital techniques both typically rely on gyroscopes or accelerometers to detect and measure camera vibrations. In the case of optical stabilization, the measurements (i.e., pan and tilt) are relayed to actuators that move a lens or sensor in the optical chain to compensate for the camera motion. Optical image stabilization is currently preferred for long focal lengths and low light conditions.

EIS uses algorithms to model camera motion, which then are used to correct the images. Pixels outside the border of the visible image are used as a buffer for motion and the information on these pixels can then be used to shift the electronic image from frame to frame, enough to counterbalance the motion and create a stream of stable video. While existing approaches may experience difficulties in distinguishing between moving objects in the field of view and camera vibrations, these and other problems are being solved by adjusting frame buffering intervals and other improvements.

As mentioned, the instant invention may take advantage of image interpolation techniques, particularly if long focal lengths are used and/or until higher resolution image sensors and flat-panel microdisplays are developed. As with motion compensation, the instant invention may use a variety of techniques for image interpolation, including adaptive and adaptive and non-adaptive approaches. Adaptive methods change depending on what they are interpolating (sharp edges vs. smooth texture), whereas non-adaptive methods treat all pixels equally. While the invention may be used to gather still stereoscopic images, when used as binoculars, motion interpolation or motion-compensated frame interpolation (MCFI) may be used. In this case intermediate animation frames are generated between existing frames using an appropriate interpolation algorithm to make animation more fluid, to compensate for display motion blur, and synthesize slow-motion effects during replay.

The invention claimed is:

1. A smartphone with integrated electronic binoculars, comprising:
   a housing including a touch-screen display, cellular and wireless network communications circuitry, and first and second outer surfaces facing in different directions;
   a pair of spaced-apart right and left imagery-gathering devices disposed on the first outer surface of the smartphone;
   right and left image sensors disposed in the smartphone to convert the imagery gathered by the right and left image-gathering devices into electrical signals representative of the right and left imagery;
   a pair of spaced-apart, physically separated right and left image-displaying devices disposed on the second outer surface of the smartphone; and
   electronic circuitry disposed within the smartphone to receive the electrical signals from the right and left image sensors and simultaneously display the imagery gathered by the right and left image-gathering devices on the right and left image-displaying devices, respectively.

2. The smartphone of claim 1, wherein the imagery gathered and displayed is real-time motion imagery.

3. The smartphone of claim 1, wherein the touch-screen display enables a user to adjust one or more of the following functions associated with the right and left imagery:
   focusing;
   zooming in and zooming out; and
   capture and storage of the imagery for later retrieval and display.

4. The smartphone of claim 1, wherein the electronic circuitry is further operative to perform an auto focusing of the imagery.

5. The smartphone of claim 1, wherein:
   right and left image-gathering devices include objective optics; and
   the objective optics project images directly onto right and left image sensors immediately adjacent the objective optics.

6. The smartphone of claim 1, wherein:
   right and left image-gathering devices include objective optics; and
   one or more optical components are disposed between the right and left objective optics and the right and left image sensors to perform optical focusing or optical zoom functions.

7. The smartphone of claim 1, wherein:
   right and left image-gathering devices include objective optics; and
   the right and left image sensors are spaced apart from the right and left image-gathering devices to increase focal length.

8. The smartphone of claim 1, wherein the first and second outer surfaces face in opposite directions.

9. The smartphone of claim 1, further including apparatus for adjusting interpupillary distance.

10. The smartphone of claim 1, further including apparatus for activating an electronic binocular instant-on function.

11. The smartphone of claim 1, further including apparatus for stabilizing the imagery.

12. The smartphone of claim 1, further including apparatus for interpolating the imagery.

13. The smartphone of claim 1, further including a user control for zooming the imagery in and out.

14. The smartphone of claim 1, further including LIDAR operative to assist with focusing the imagery.

15. The smartphone of claim 1, wherein the image sensors operate in the infrared (IR) portion of the electromagnetic spectrum enabling the binoculars to perform a night vision function.

16. The smartphone of claim 1, further including manually deployable light shields proximate to the right and left image-displaying devices.

17. The smartphone of claim 1, wherein:
   the right and left image-displaying devices are microdisplays with diagonal measurements of 0.5 inches or less; and
   one or more optical components to magnify the microdisplays.

18. The smartphone of claim 1, wherein:
   the right and left image sensors are separate solid-state devices; or
   the right and left image sensors use different regions of the same solid-state device.

* * * * *